Patented Sept. 1, 1931

1,821,117

UNITED STATES PATENT OFFICE

AENNE SCHREINER, OF FRANKFORT-ON-THE-MAIN, GERMANY

PROCESS FOR PRODUCING HIGHLY ACTIVE CARBON

No Drawing. Application filed June 20, 1928, Serial No. 287,039, and in Germany June 22, 1927.

For the purpose of producing active carbon from wood or the like, the latter is impregnated with saline solutions of different kinds, heated in an air-tight furnace, and then lixiviated by means of hydrochloric acid and water. According to the present invention the wood or other carboniferous materials is activated by thiocyanates of alkalies or alkaline earth metals or by potassium ferrocyanide. This process can be cheapened, however, by replacing ⅓ or ⅔ of the chemicals mentioned above by alkali or alkaline earth salts of different kinds, and in this way a product similar to the product of the original process is obtained at less cost.

*Example according to methods 1 and 2*

Seasoned wood in form small squares (or of sawdust) is impregnated with a solution of potassium sulphocyanate or ferrocyanide, dried and then heated up to 300 or 350° C.; the gaseous and distillation products are collected and can be utilized. Now the heating in the air-tight chamber takes place for about ½ hour, and the heated product is lixiviated with very little water, and, if desired for reducing the percentage of ashes, with diluted hydrochloric acid, and then washed once more with hot water. The saline solution regained is then concentrated and can be used anew.

*Example according to method 3*

Consistent with the equation:

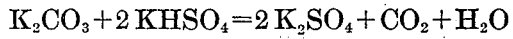

$$K_2CO_3 + 2\,KHSO_4 = 2\,K_2SO_4 + CO_2 + H_2O$$

not the whole quantity of carbonate of potassium corresponding to the equation is dissolved by means of the bisulphate of potassium, but there is still a weak alkaline reaction left in the reaction liquid. By mixing the solution resulting with potassium sulphocyanate there will be carbonate of potassium, sulphate of potassium and potassium sulphocyanate side by side. This salt mixture exercises a considerable effect on the carbonaceous substances to be activated, and can directly be added to the solid carbonization products of wood, peat and brown coal. However, the alkaline carbonate mentioned on the one hand and the alkaline sulphate on the other hand may be replaced with equal advantage by other alkali or alkaline earth salts.

The methods hitherto in use have employed solutions for impregnating that were either strongly alkaline (potash) or decisively acid (phosphoric acid). The corrosive effect of the strong alkalies at the high temperatures (900 to 1100° C.) required will result in a heavy wear and tear of the furnace plant. The superiority of my process lies in the use of a neutral or quite weak alkaline solution, and that the temperature need not exceed 800° C.

Moreover, the strong alkalies at the intense heat have a destructive effect on the product, whereas by the use of the nitrogen eliminating salts there is no combustion whatever. In working by the present invention charcoal will yield from 80 to 85%, whereas the average yield of active carbon in the industry amounts usually to 40 or 50%, and some of the known methods yield only 12 or 14%.

Great difficulties were also caused hitherto by the mashing of the active coal, owing to the large quantity of water used and the slow filtration, especially where during the process compositions are formed that are hard to dissolve. In the present invention the washing is easily and quickly done by the use of a much smaller amount of water. Washing with acid is not required, except in the case of producing medicinal charcoal.

Comparative tests, made according to the prescription of the German Dispensatory (6th edition page 133), resulted for the best absorption coal at present in the market in a titration standard of 30 to 35 cc. of methylic cyanogen, whereas there was a titration standard of methylene no less than 56 in the products obtained by the present invention. The expression "alkali-forming metal" is hereinafter used to embrace the alkali metals and the alkaline earth metals. The expression "compound cyanide" is hereinafter used to embrace sulphocyanides and ferrocyanides.

I claim:

1. In the production of highly active carbon, the herein described process which comprises impregnating solid carbonaceous material with a solution containing a compound cyanide of an alkali-forming metal, heating the impregnated product under substantially complete exclusion of air, sufficiently to carbonize the material, and thereafter leaching the product.

2. Process as in claim 1, in which the carbonaceous material treated is wood.

3. Process as in claim 1, in which the impregnation solution contains other salts which are not powerfully acid or powerfully alkaline.

4. Process as in claim 1 in which the solute in the impregnating solution is composed of alkali metal sulfate, alkali metal carbonate and a compound cyanide.

5. Process as in claim 1 in which the heating of the impregnated carbonaceous material is carried to not over 800° C.

6. Process as in claim 1 in which the heating of the impregnated carbonaceous material is carried only to about 300–350° C.

In testimony whereof I affix my signature.

AENNE SCHREINER.